US011932551B2

(12) United States Patent
Eisele (10) Patent No.: US 11,932,551 B2
(45) Date of Patent: Mar. 19, 2024

(54) SALT PRODUCTION VIA HYDROHALITE DECOMPOSITION

(71) Applicant: MICHIGAN TECHNOLOGICAL UNIVERSITY, Houghton, MI (US)

(72) Inventor: Tim Eisele, Houghton, MI (US)

(73) Assignee: MICHIGAN TECHNOLOGICAL UNIVERSITY, Houghton, MI (US)

(*) Notice: Subject to any disclaimer, the term of this patent is extended or adjusted under 35 U.S.C. 154(b) by 787 days.

(21) Appl. No.: 17/039,481

(22) Filed: Sep. 30, 2020

(65) Prior Publication Data

US 2021/0122643 A1 Apr. 29, 2021

Related U.S. Application Data

(60) Provisional application No. 62/925,501, filed on Oct. 24, 2019.

(51) Int. Cl.
| | |
|---|---|
| C01D 3/06 | (2006.01) |
| C01B 6/34 | (2006.01) |
| C01B 9/02 | (2006.01) |
| C01D 3/14 | (2006.01) |

(52) U.S. Cl.
CPC ............... *C01D 3/06* (2013.01); *C01B 6/34* (2013.01); *C01B 9/02* (2013.01); *C01D 3/14* (2013.01)

(58) Field of Classification Search
CPC ... C01D 3/04; C01D 3/06; C01D 3/08; C01D 3/22; C01D 3/24; C01D 3/14; C01B 6/34; C01B 9/02; C01P 2004/60
USPC ...................................................... 423/499.5
See application file for complete search history.

(56) References Cited

U.S. PATENT DOCUMENTS

| 1,009,736 A | 11/1911 | Goldman |
| 1,141,999 A | 6/1915 | Weil |
| 3,655,333 A * | 4/1972 | Stenger ............... C01D 3/06 |
| | | 23/303 |

(Continued)

FOREIGN PATENT DOCUMENTS

| CN | 106800304 A | * | 6/2017 |
| GB | 1009736 | * | 11/1965 |

(Continued)

OTHER PUBLICATIONS

Drebushchak, V.A., Ogienko, A.G. Calorimetric measurements of sodium chloride dihydrate (hydrohalite). J Therm Anal Calorim 140, 2555-2562 (2020). (Year: 2020).*

(Continued)

*Primary Examiner* — Anthony J Zimmer
*Assistant Examiner* — Zachary John Baum
(74) *Attorney, Agent, or Firm* — Michael Best & Friedrich LLP (57) ABSTRACT

Salt production can include preparing hydrohalite particles by crystallization from saturated brine, adding the hydrohalite particles to a salt brine, thereby forming a hydrohalite-salt brine mixture, agitating the hydrohalite-salt brine mixture until the hydrohalite particles have decomposed into NaCl crystals, and filtering out the NaCl crystals from the salt brine. In some instances, an initial temperature of the salt brine prior to adding the hydrohalite particles is at least 0° C. In some instances, a ratio of salt brine to hydrohalite particles, by weight, is from 0.4 to 29.

10 Claims, 8 Drawing Sheets

(56) References Cited

U.S. PATENT DOCUMENTS

| | | | | |
|---|---|---|---|---|
| 3,779,030 A | * | 12/1973 | Best | C01D 3/06 |
| | | | | 23/303 |
| 4,026,676 A | | 5/1977 | Fiedelman | |
| 5,366,514 A | | 11/1994 | Becnel, Jr. et al. | |
| 6,267,789 B1 | * | 7/2001 | Ninane | C01D 3/14 |
| | | | | 423/166 |
| 8,771,380 B2 | | 7/2014 | Bakkenes et al. | |
| 8,888,867 B2 | | 11/2014 | Bakkenes et al. | |
| 2011/0129409 A1 | | 6/2011 | Bakkenes et al. | |
| 2011/0214257 A1 | | 9/2011 | Bakkenes et al. | |

FOREIGN PATENT DOCUMENTS

| | | | | |
|---|---|---|---|---|
| GB | 1009736 A | | 11/1965 | |
| WO | WO-2010060718 A1 | * | 6/2010 | C01D 3/06 |

OTHER PUBLICATIONS

Cargill. Cargill(R) "Food Processing Salts: Microsized(R) Salts—Physical Information." (Year: 2017).*

English translation of CN-106800304-A Description (Year: 2017).*

Sedivy, V. M. (2009) "Environmental Balance of Salt Production Speaks in Favour of Solar Saltworks", Global NEST Journal, vol. 11, No. 1, pp. 41-48.

Hameri et al., "Hygroscopic growth of ultrafine sodium chloride particles," J. of Geophysical Research, 2001, 106 (D18):20749-20757.

International Search Report and Written Opinion for Application No. PCT/US2020/053584 dated Jan. 29, 2021 (14 pages).

\* cited by examiner

SALT PRODUCTION VIA HYDROHALITE DECOMPOSITION

CROSS-REFERENCE TO RELATED APPLICATION(S)

This application claims the benefit of and priority to U.S. Provisional Patent Application No. 62/925,501, filed on Oct. 24, 2019, the entire contents of which are fully incorporated herein by reference.

TECHNICAL FIELD

The presently disclosed subject matter is directed to producing salt. More particularly, the present disclosure relates to systems and methods for salt production using decomposition of hydrohalite.

Introduction

Salt (NaCl) has a number of applications where a fine particle size and high surface area are desirable. These properties lead to faster dissolution in water, and increased surface for holding flavors, odors, and other additives. Faster dissolution results in a salt that, when applied to the surface of food, provides the desired salty flavor with much less actual salt addition. The ability to hold flavors and odors makes the salt desirable for products such as "bath bombs", which are perfumed and need to dissolve quickly in bath water. The process described here is a method for economically producing salt particles smaller than 150 micrometers, with irregular surfaces that have more surface area than the cubical crystals that are more typical of salt grains.

The current art for producing salt crystals is based on heating saturated salt solutions to evaporate water, resulting in a supersaturated solution that salt crystals spontaneously crystallize from (Sedivy, 2009). It is possible to control the crystallization conditions to produce various grades of salt with different particle sizes and shapes (Weil, 1915), but water evaporation is very energy-intensive and there is a limit to the fineness and surface area that can be achieved in the resulting crystals. Certain chemical additives, such as sodium ferrocyanide and alkali metal phosphates, may be added to vacuum pan or solar evaporator plants to produce "dendritic" morphologies that have a high surface area (Fiedelman, 1977), but the additives can cause undesirable contamination of the salt.

When a saturated sodium chloride brine is cooled from room temperature to a temperature cooler than about −5° C., but no cooler than −21° C., the saturated sodium chloride brine precipitates crystals of hydrohalite, $NaCl \cdot 2H_2O$ (Turner, 1965; Bakkenes et al., 2014a). When the hydrohalite crystals are warmed above about 4° C., the hydrohalite crystals decompose to form NaCl crystals and a separate salt brine solution. The salt brine can then be removed from the NaCl crystals by settling, filtration, or other dewatering methods to produce a dry salt (Bakkenes et al., 2014b)

SUMMARY

The instant disclosure is directed to salt production. In one aspect, salt production can include preparing hydrohalite particles by crystallization from saturated brine, adding the hydrohalite particles to a salt brine, thereby forming a hydrohalite-salt brine mixture, agitating the hydrohalite-salt brine mixture until the hydrohalite particles have decomposed into NaCl crystals, and filtering out the NaCl crystals from the salt brine. In some instances, an initial temperature of the salt brine prior to adding the hydrohalite particles is at least 0° C. In some instances, a ratio of salt brine to hydrohalite particles, by weight, is from 0.4 to 29.

There is no specific requirement that a material, technique or method relating to salt production include all of the details characterized herein, in order to obtain some benefit according to the present disclosure. Thus, the specific examples characterized herein are meant to be exemplary applications of the techniques described, and alternatives are possible.

DETAILED DESCRIPTION

The present disclosure is directed to salt production by controlling the decomposition conditions of the hydrohalite, resulting in NaCl crystals with fine particle size and high surface area. The use of warm, saturated brine to quickly decompose the hydrohalite is an innovative approach to rapidly providing heat for hydrohalite decomposition, without actually requiring the use of a high-temperature heat source. The brine need not exceed room temperature, and the heat energy can come entirely from low-grade environmental heat sources at minimal cost.

We have found that NaCl crystals can be produced with a very fine particle size and high surface area by controlling the decomposition conditions of the hydrohalite. If thermal energy is rapidly added to the hydrohalite to minimize the time it takes for the hydrohalite to decompose to NaCl and brine, the result is salt particles with a mean particle size smaller than 150 micrometers. These particles also have an irregular surface that gives them a high surface area, unlike the smoothly cubical shape of salt produced by evaporative methods. The fine-grained NaCl generated by this process has a number of useful properties, including ease of mixing with other ingredients, absorption of flavors and scents, fast dissolution, and superior adhesion to food surfaces as a salt coating. Additional advantages of producing fine, high-surface-area salt by this means are, first, that no chemical additives of any type are required; and second, that the hydrohalite crystallization is very selective against common salt contaminants such as calcium sulfate. As a result a very high-purity NaCl product is inherently produced, in excess of 99.8% pure salt.

A convenient method for achieving a high hydrohalite decomposition rate is to immerse the hydrohalite in a sufficient quantity of saturated, room-temperature NaCl brine. The intimate contact between the brine and the hydrohalite gives excellent heat transfer and rapidly decomposes the hydrohalite in less than 10 minutes. This rapid decomposition results in the desired fine NaCl grains. The addition of the brine also prevents the NaCl grains from coarsening, which would otherwise happen very rapidly. Finally, the best saturated brine to use is the fresh brine that is about to enter the hydrohalite crystallizer. Using the brine to decompose the hydrohalite significantly precools the brine, reducing the cooling load on the crystallizer.

Other methods that have been found to transfer heat to the decomposing hydrohalite crystals at an adequate rate to produce fine salt are (1) Microwave heating, which can fully decompose the hydrohalite in 2-8 minutes, (2) Continuous vacuum filtration of the hydrohalite, which continuously draws either room-temperature air or heated air through the hydrohalite while removing the brine as rapidly as the hydrohalite decomposes, (3) Heating a thin layer of hydrohalite with hot air, rapidly decomposing the hydrohalite, and (4) Placing the hydrohalite in a container that uses a hot-water jacket or other heat source to heat the hydrohalite. All four of these other alternatives provide a means for producing the desired product, and other methods do exist that could transfer heat into the hydrohalite at an adequate rate. However, the alternatives do not allow for heat exchange between the hydrohalite being decomposed, and the warm brine entering the process, which is important for reducing the cooling load on the crystallization system.

The particle size distribution of the salt produced has been found to depend on the following factors: (1) The time taken for the hydrohalite to decompose to NaCl, with more rapid decomposition leading to finer NaCl crystals, (2) The length of time that the fine NaCl remains in the brine after the hydrohalite decomposes, with longer time leading to coarser NaCl crystals, and (3) The quantity of brine used to suspend the fine NaCl crystals, with a larger ratio of brine to fine salt greatly retarding the coarsening of the NaCl crystals. It appears that these factors affect the two basic phenomena of concern in producing fine salt from hydrohalite—the actual decomposition, and subsequent grain coarsening of the salt grains.

I. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," and variants thereof are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising" and "consisting essentially of," the embodiments or elements presented herein, whether explicitly set forth or not.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The term "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" can refer to plus or minus 10% of the indicated number. For example, "about 10%" can indicate a range of 9% to 11%, and "about 1" can mean from 0.9-1.1. Other meanings of "about" can be apparent from the context, such as rounding off, so, for example "about 1" can also mean from 0.5 to 1.4.

Definitions of specific functional groups and chemical terms are described in more detail below. For purposes of this disclosure, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito, 1999; Smith and March March's Advanced Organic Chemistry, 5th Edition, John Wiley & Sons, Inc., New York, 2001; Larock, Comprehensive Organic Transformations, VCH Publishers, Inc., New York, 1989; Carruthers, Some Modern Methods of Organic Synthesis, 3rd Edition, Cambridge University Press, Cambridge, 1987; the entire contents of each of which are incorporated herein by reference.

II. Decomposition

Hydrohalite crystals contain two molecules of water for each NaCl formula unit, and this water is fully incorporated as an integral part of the crystal structure. The hydrohalite crystals are monoclinic, prismatic crystals. The hydrohalite crystals begin to decompose to sodium chloride (NaCl) and saturated salt brine at 0.1° C., and the decomposition rate becomes rapid by 3-4° C. The temperature of the decomposing hydrohalite has been found to be arrested at approximately 4° C. due to energy going to decompose hydrohalite rather than to increase temperature. Temperature increasing to above 4° C. indicates that decomposition is complete.

The NaCl crystals that form from decomposing hydrohalite are face-centered cubic crystals, which is an entirely different crystal structure from the monoclinic hydrohalite. As a result, the NaCl crystals must nucleate new crystals, independent from the crystal structure of the hydrohalite. If heat energy flows into the hydrohalite crystals very slowly, then only a few NaCl crystals will nucleate, and the salt from the remaining hydrohalite will transfer to these nuclei, causing them to grow instead of nucleating fresh crystals. However, if heat energy is added very rapidly, then there will be insufficient time for NaCl from decomposing hydrohalite to diffuse to already-existing nuclei, and instead numerous crystals will nucleate. If this decomposition is sufficiently rapid, then the NaCl nuclei will not be able to grow very large before the hydrohalite is completely decomposed, and the result will be very fine-sized salt crystals.

III. Grain Coarsening

Once the NaCl crystals have formed, there is a thermodynamic driving force to reduce their surface area. Since large numbers of fine particles have a much higher surface area per unit mass than smaller numbers of larger particles, these crystals can reduce their surface area by dissolving smaller crystal particles, and recrystallizing them onto larger particles. In order for this to happen, two things must be true: 1. The crystals must be immersed in a saturated brine, so that the dissolution and recrystallization reactions are in equilibrium, and 2. The crystals must be close enough to each other that NaCl that dissolves from a small crystal can easily diffuse to a larger crystal to reprecipitate, rather than reprecipitating on the surface of the crystal that they just dissolved from.

If the hydrohalite is allowed to decompose directly to brine and NaCl, then the volume of brine is approximately the same as the volume of NaCl crystals, and so the crystals are very close together. This allows rapid diffusion of salt from smaller crystals to larger crystals, and the crystals can coarsen rapidly. However, if additional brine is added, then the additional brine separates the grains from each other sufficiently that diffusion between grains becomes negligible. This aids in preserving a fine grain size, so that it becomes practical to dewater the fine NaCl grains before the NaCl grains can coarsen and lose the properties of fineness and high surface area.

IV. Example Methods for Salt Production

An example method for producing salt can include preparing hydrohalite particles by crystallization from saturated brine. In some instances, preparing the hydrohalite particles by crystallization occurs at a temperature of no less than −20° C. and no more than −8° C. Then the hydrohalite particles may be added to a salt brine, thereby forming a hydrohalite-salt brine mixture. An initial temperature of the salt brine prior to adding the hydrohalite particles is at least 0° C. In some instances, the initial temperature of the salt brine is no greater than 37° C.

A ratio of salt brine to hydrohalite particles, by weight, is from 0.4 to 29. Next, the hydrohalite-salt brine mixture is agitated until the hydrohalite particles have decomposed into NaCl crystals. In some instances, the hydrohalite particles decompose during agitation in less than 10 minutes.

Then, the NaCl crystals are filtered out from the salt brine. In some instances, a time between starting agitating the hydrohalite-salt brine mixture and starting filtering out the NaCl crystals is less than 24 hours. Filtering out the NaCl crystals can include using vacuum filtration.

In some instances, after agitating the hydrohalite-salt brine mixture, the salt brine has a lower temperature than the initial temperature. Some implementations of the example method can also include transferring the salt brine at the lower temperature to a crystallizer to generate additional hydrohalite particles.

In various implementations, a mean particle size of the produced salt particles is less than 150 μm. In various implementations, a purity of the produced salt particles is at least 99.8% pure.

V. Example System for Salt Production

Figure 8:
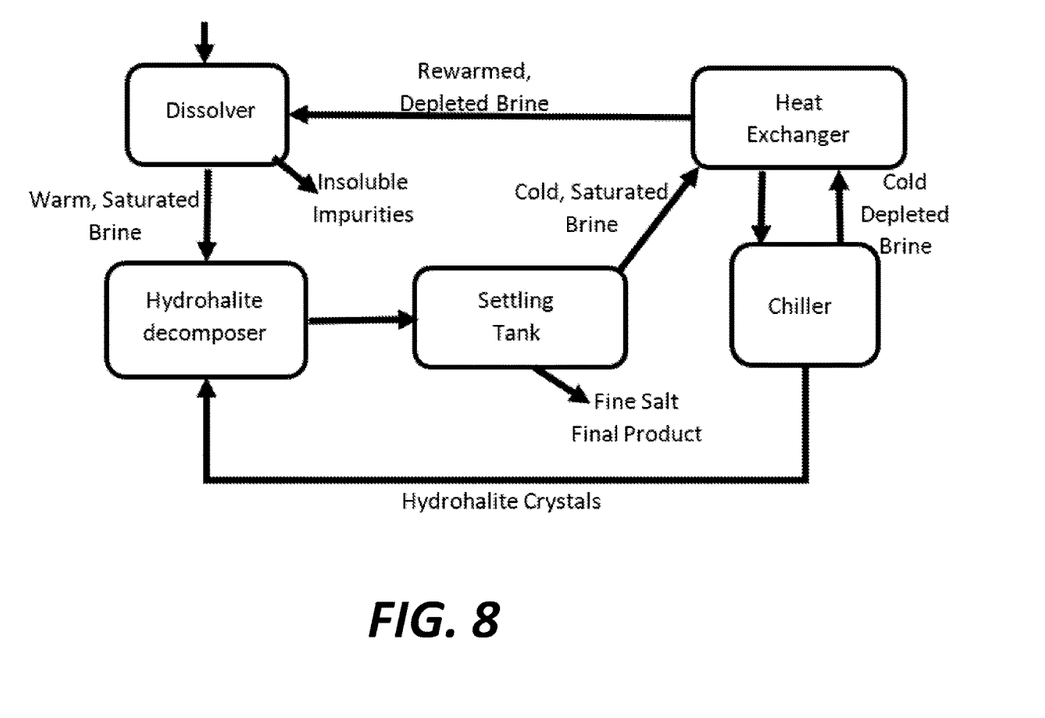
FIG. 8 is a schematic diagram of an exemplary system for salt production with rapid hydrohalite decomposition.

FIG. 8 is a schematic diagram of a system for salt production. In operation of the system, rapid decomposition of the hydrohalite crystals occurs by direct contact with warm, saturated brine. The rapid decomposition produces very fine crystals, and the dilution of the grains in brine prevents them from transferring salt from small grains to larger ones, which would lead to grain coarsening. The use of brine to decompose the hydrohalite also leads to precooling of the brine, reducing the energy needed in the chiller to precipitate hydrohalite.

In an example operation of the system shown in FIG. 8, impure salt is introduced to the dissolver, where the sodium chloride dissolves and is separated from insoluble impurities by any appropriate means. The warm saturated brine from the dissolver is then combined with hydrohalite, decomposing the hydrohalite to form purified, high-surface-area salt. Once the purified salt is separated as a final product, the brine is pre-cooled and enters a heat exchanger where the brine is further cooled before entering a crystallizing chiller. Hydrohalite crystallizes in the chiller, and is removed to return to the hydrohalite decomposer. The depleted brine remaining is then returned through the heat exchanger to cool the incoming brine, and is then returned to the dissolver to dissolve additional sodium chloride. A notable feature of this process is the return of the hydrohalite from the chiller to the decomposer, where the decomposer simultaneously produces fine salt of the desired properties while also saving energy by precooling the incoming brine.

VI. Experimental Results

The compositions and methods of the disclosure will be better understood by reference to the following experimental results, which are intended as an illustration of and not a limitation upon the scope of the disclosure.

Experiments were conducted by first producing batches of hydrohalite crystals. This was done either by placing 1-liter polyethylene beakers filled with saturated NaCl brine into a freezer set to −20° C., and allowing to crystallize overnight, or by collecting hydrohalite crystals from a semicontinuous crystallizer operating at −10° C. The excess brine was then poured off, leaving hydrohalite crystals.

For experiments using hydrohalite produced in beakers, there were approximately 50 grams of hydrohalite. Varying quantities of saturated brine at room temperature (20-23° C.) were added to the hydrohalite, and then allowed to decompose over a measured time interval with occasional stirring. Quantities of added brine were varied from zero to 500 grams, and the decomposition time varied from 3 minutes to 3 hours. At the end of the decomposition time, the brine was poured off, leaving the fine NaCl crystals in the beaker. The crystals were then immediately filtered using a pressure filter to remove as much adhering water as possible, followed by air-drying overnight before sieving to determine the size distribution For experiments using hydrohalite from the crystallizer, desired amounts of hydrohalite were weighed into beakers, and then room-temperature saturated brine was added.

Figure 1:
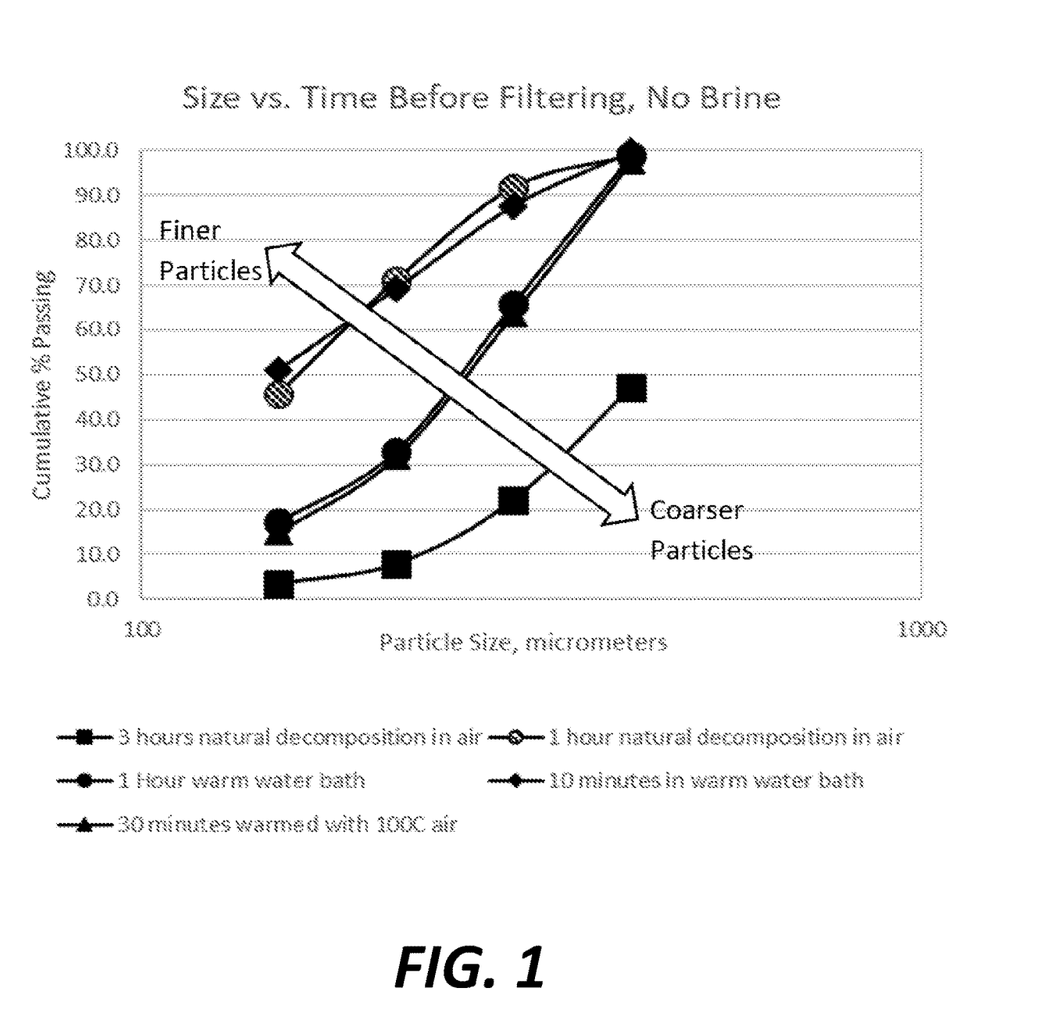
FIG. 1 shows size distributions of experimentally-produced salt products produced when there was zero warm brine added to the hydrohalite.

FIG. 1 shows the size distributions of salt products produced when there was zero warm brine added to the hydrohalite. If the beaker was allowed to stand and warm naturally, it took approximately one hour for the hydrohalite to decompose. The decomposition time could be shortened to 30 minutes by placing the hydrohalite in a forced-air drying oven at 100° C., and to 10 minutes by immersing the bottom of the beaker in warm water. We can see that the size distribution was the same after either 10 minutes or after 1 hour, provided that the salt was immediately removed from the brine and filtered. However, if the hydrohalite was decomposed and then allowed to stay in the brine, as in the case with the 1 hour water bath or the 30 minutes in the drying oven, the salt particles coarsened a great deal. And, if the salt was allowed to remain in the brine produced by the hydrohalite decomposition for three hours, the salt grains continued to coarsen.

Figure 2:
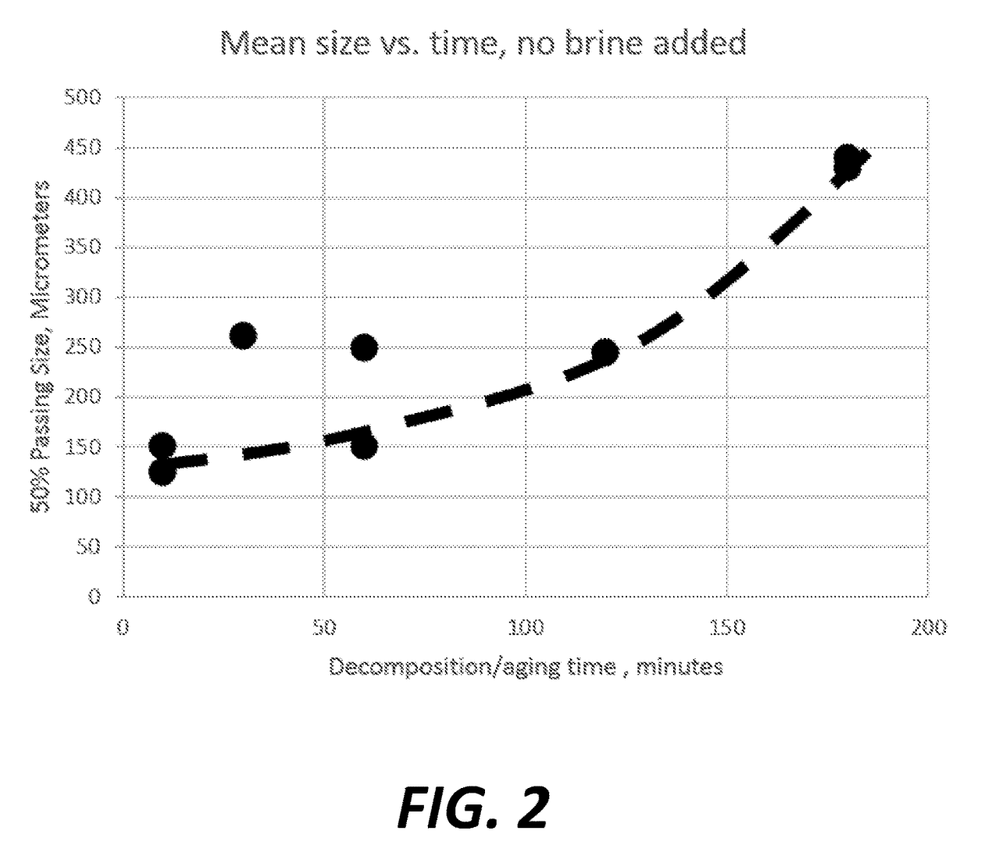
FIG. 2 shows experimental data of coarsening of the mean particle size as a function of decomposition/aging time, in the absence of any added brine.

FIG. 2 shows the 50% passing size (half of the mass of the product is particles that are small enough to pass through an opening of that size) as a function of decomposition time. This shows that the salt product begins coarsening at a time between 10 minutes and 30 minutes.

Figure 3:
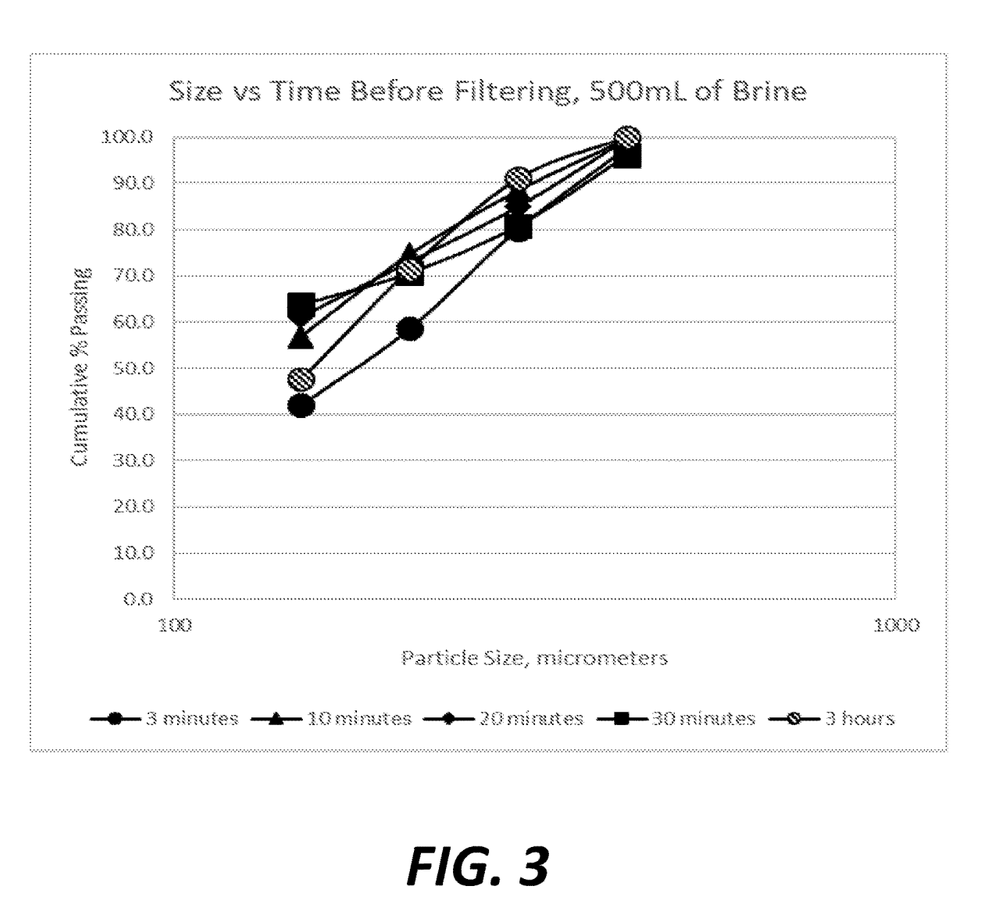
FIG. 3 shows experimental data of particle size distribution when hydrohalite was decomposed in 500 mL of added brine.

In contrast, when 500 ml of additional brine was added to the hydrohalite (approximately 10 times the mass of the hydrohalite), all of the products maintained a fine size distribution, even after as much as 3 hours, as shown in FIG. 3.

Figure 4:
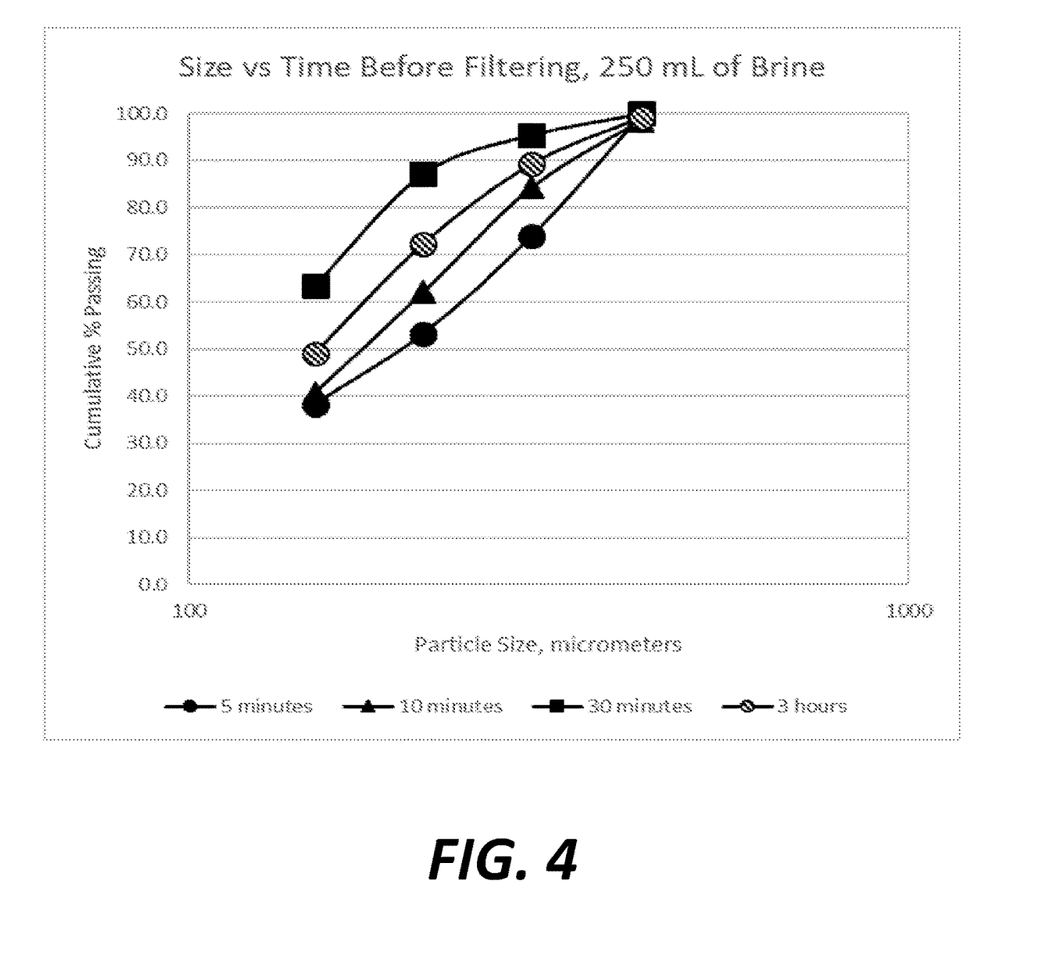
FIG. 4 shows experimental data of particle size distributions when hydrohalite was decomposed in 250 mL of additional saturated brine.
Figure 5:
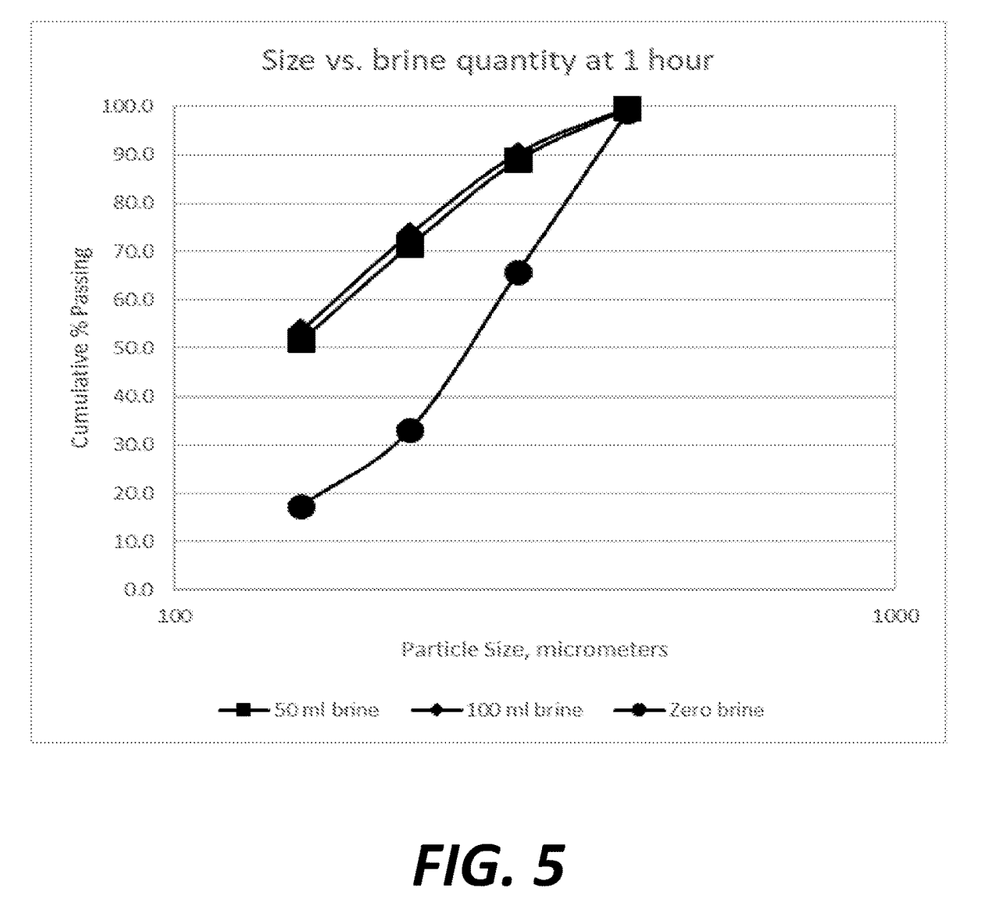
FIG. 5 shows experimental data of the effect of adding increasing quantities of warm brine to approximately 50 g of hydrohalite on the particle size distribution.

Experiments with 250 mL of added warm brine (approximately 5 times the hydrohalite mass) gave very similar results, although with more variation in particle size distribution, as can be seen in FIG. 4. The quantity of added warm brine can be as low as 50 grams and still produce a fine size distribution, as shown in FIG. 5. An important aspect appears to be that the added brine must provide enough heat energy to completely decompose the hydrohalite.

These results clearly show that the addition of supplemental brine is very effective for suppressing the coarsening of the fine salt, while simultaneously providing the heat transfer capacity to rapidly decompose the hydrohalite, and allowing incoming brine to be pre-cooled before the brine enters the crystallizer, saving a considerable amount of cooling energy. The optimum conditions for hydrohalite decomposition to produce fine salt is to immerse the hydrohalite in a quantity of warm, saturated brine that contains sufficient heat energy to completely decompose the hydrohalite while still maintaining a temperature above 0° C.

Figure 6:
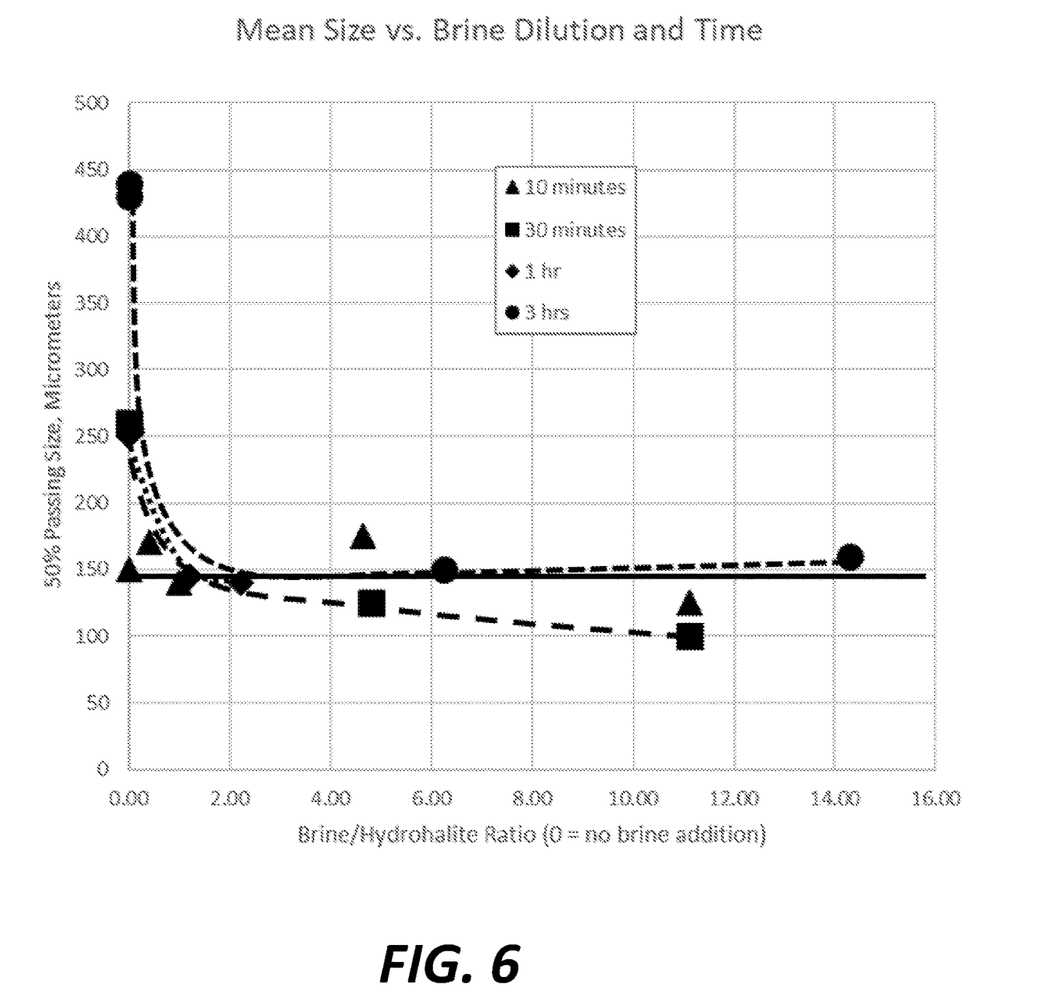
FIG. 6 shows experimental data of mean size of hydrohalite as a function of warm brine addition, for different decomposition/aging times.

Comparing all of these experiments by plotting the mean particle size versus the ratio of warm brine to hydrohalite for different decomposition times produces the graph shown in FIG. 6. Here, we see that fast decomposition (under 10 minutes) reliably produces fine salt, and that the addition of extra brine consistently results in a fine product that is finer than what is achieved with long decomposition times in the absence of brine. As shown in FIG. 6, the finest salt is produced when either the time is shorter than 30 minutes, or the brine addition is at least equal to the hydrohalite mass.

Figure 7:
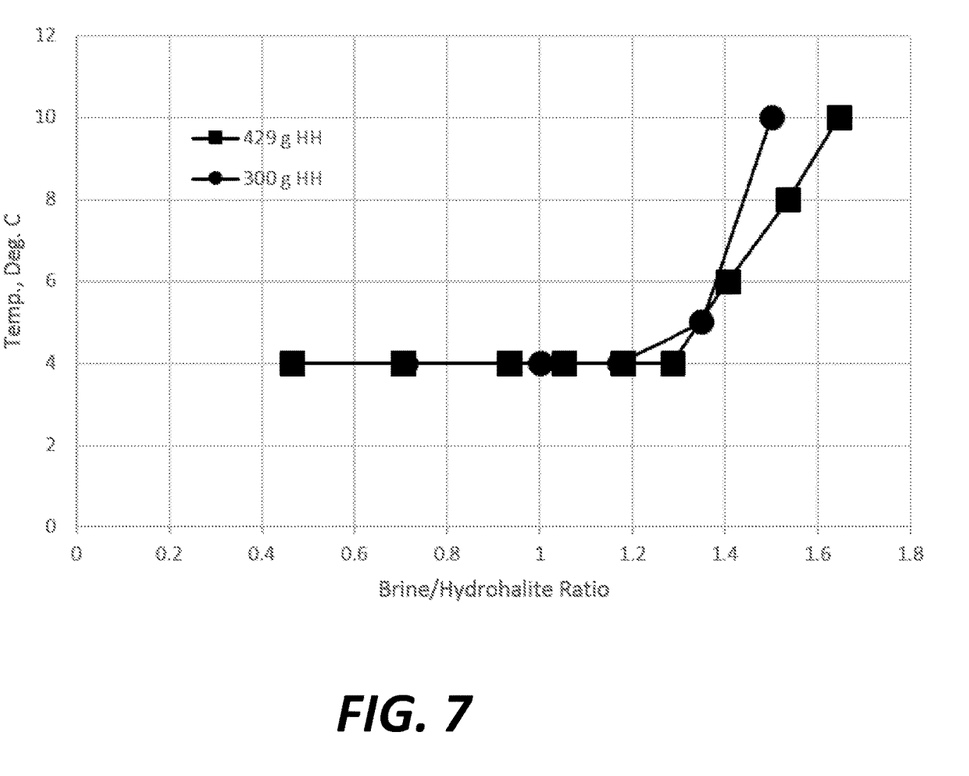
FIG. 7 shows experimental data of temperature of hydrohalite suspended in brine as the quantity of brine was increased.

Experiments were conducted to determine how the temperature of the hydrohalite+brine varied as the ratio of brine to hydrohalite was varied. One experiment started with 300 grams hydrohalite, and the other started with 429 grams hydrohalite. The starting hydrohalite temperature was −5° C. and the starting brine temperature was 26° C. These experiments were conducted by starting with a weight quantity of hydrohalite crystals, and then adding increments of room-temperature brine every 30 seconds while continuously stirring the crystal slurry and measuring the temperature. The results are shown in FIG. 7, which clearly shows that the temperature of the brine+hydrohalite remains at 4° C. until the ratio of brine to hydrohalite exceeds 1.3. The temperature of 4° C. is the point where the decomposition kinetics of the hydrohalite become fast enough that added heat energy is absorbed by the decomposition rather than by increasing the temperature of the hydrohalite.

At a brine to hydrohalite ratio of 1.3, we used 1.3 kg of brine at 26° C. to decompose 1 kg of hydrohalite. The heat capacity of saturated salt brine is 3300 J/kg-K, and so cooling 1.3 kg of brine from 26° C. to 4° C. provides 94,380 Joules of heat. Without being bound by a particular theory, it appears that a potentially important parameter for decomposing the hydrohalite is therefore to provide 94,380 Joules per kilogram of hydrohalite. The quantity of brine needed to provide this amount of energy will vary with the initial brine temperature, as shown in Table 1. This shows that the incoming brine should be warmer than 10° C. if the mass of brine used is to be less than 5 times the mass of the hydrohalite being decomposed.

TABLE 1

Ratio of warm brine weight to hydrohalite weight needed to completely decompose hydrohalite without additional thermal energy inputs.

| Brine Temperature, ° C. | Brine/Hydrohalite Ratio (by weight) |
|---|---|
| 40 | 0.79 |
| 30 | 1.1 |
| 25 | 1.36 |
| 20 | 1.79 |
| 15 | 2.60 |
| 10 | 4.77 |
| 5 | 28.6 |

An example process for producing fine salt, incorporating hydrohalite decomposition to produce fine salt, is as follows. First, hydrohalite is produced from chilled, saturated salt brine. The hydrohalite crystals are separated from the brine, with the depleted brine returned to the salt dissolver.

Then, fresh saturated brine is taken from the room-temperature salt dissolver (temperature greater than 10° C.) and placed in a mixing tank. The hydrohalite crystals are then added to this warm brine. The mass of brine should be large enough that the brine will contain sufficient thermal energy to decompose the hydrohalite, as per Table 1. The warmth of the brine rapidly decomposes the hydrohalite crystals to form fine NaCl crystals. Since this brine is already saturated with NaCl, the brine does not dissolve the fine NaCl crystals. Experimentation has shown that this procedure can completely decompose hydrohalite to NaCl within 2-5 minutes, depending on the hydrohalite crystal size and intensity of mixing. It is desirable to keep the decomposition time shorter than 10 minutes to avoid grain coarsening.

Then the saturated brine with suspended fine NaCl crystals is then allowed to settle. The fine NaCl crystals settle from suspension within approximately 2 minutes, although up to 1 hour can be allowed before grain coarsening becomes significant. The saturated brine is then decanted, leaving NaCl crystals that can be filtered and dried.

Then the saturated brine is now cooled, potentially to as little as 4° C., and is sent to the chiller to produce more hydrohalite. Optionally, this saturated brine may also pass through a heat exchanger with the depleted brine from Step 1, so that the saturated brine is cooled further and the depleted brine is further warmed before the depleted brine is returned to the dissolver.

The foregoing detailed description and accompanying examples are merely illustrative and are not to be taken as limitations upon the scope of the disclosure. Various changes and modifications to the disclosed embodiments will be apparent to those skilled in the art. Such changes and modifications, including without limitation those relating to the chemical structures, substituents, derivatives, intermediates, syntheses, compositions, formulations, or methods of use, may be made without departing from the spirit and scope of the disclosure.

What is claimed is:

1. A method for producing salt, the method comprising:
    preparing hydrohalite particles by crystallization from saturated brine;

adding the hydrohalite particles to a salt brine, thereby forming a hydrohalite-salt brine mixture,
  wherein an initial temperature of the salt brine prior to adding the hydrohalite particles is sufficient to decompose the hydrohalite particles without external heating;
  wherein the initial temperature of the salt brine prior to adding the hydrohalite particles is between 0° C. and 40° C.; and
  wherein a ratio of salt brine to hydrohalite particles, by weight, is from 0.4 to 29;
agitating the hydrohalite-salt brine mixture until the hydrohalite particles have decomposed into NaCl crystals; and
filtering out the NaCl crystals from the salt brine.

2. The method according to claim 1, wherein after agitating the hydrohalite-salt brine mixture, the salt brine has a lower temperature than the initial temperature, and further comprising:
  transferring the salt brine at the lower temperature to a crystallizer to generate additional hydrohalite particles.

3. The method according to claim 1, wherein the initial temperature of the salt brine is no greater than 37° C.

4. The method according to claim 1, wherein preparing the hydrohalite particles by crystallization occurs at a temperature of no less than −20° C. and no more than −8° C.

5. The method according to claim 1, wherein the hydrohalite particles decompose during agitation in less than 10 minutes.

6. The method according to claim 1, wherein a time between starting agitating the hydrohalite-salt brine mixture and starting filtering out the NaCl crystals is less than 24 hours.

7. The method according to claim 1, wherein filtering out the NaCl crystals includes using vacuum filtration.

8. The method according to claim 1, wherein a mean particle size of the NaCl crystals is less than 150 μm.

9. The method according to claim 8, wherein a purity of the NaCl crystals is at least 99.8%.

10. A method for producing salt, the method comprising:
preparing hydrohalite particles by crystallization from saturated brine;
adding the hydrohalite particles to a salt brine, thereby forming a hydrohalite-salt brine mixture,
  wherein an initial temperature of the salt brine prior to adding the hydrohalite particles is between 0° C. and 40° C.; and
  when the initial temperature of the salt brine is between 5° C. and 10° C., a ratio of salt brine to hydrohalite particles, by weight, is from 4.5 to 29;
  when the initial temperature of the salt brine is between 10° C. and 15° C., the ratio of salt brine to hydrohalite particles, by weight, is from 2.5 to 4.8;
  when the initial temperature of the salt brine is between 15° C. and 20° C., the ratio of salt brine to hydrohalite particles, by weight, is from 1.7 to 2.7;
  when the initial temperature of the salt brine is between 20° C. and 25° C., the ratio of salt brine to hydrohalite particles, by weight, is from 1.3 to 1.8;
  when the initial temperature of the salt brine is between 25° C. and 30° C., the ratio of salt brine to hydrohalite particles, by weight, is from 1.0 to 1.4; and
  when the initial temperature of the salt brine is between 30° C. and 40° C., the ratio of salt brine to hydrohalite particles, by weight, is from 0.4 to 1.2;
agitating the hydrohalite-salt brine mixture until the hydrohalite particles have decomposed into NaCl crystals; and
filtering out the NaCl crystals from the salt brine.

\* \* \* \* \*